US 6,637,304 B2

(12) United States Patent
Singer

(10) Patent No.: US 6,637,304 B2
(45) Date of Patent: Oct. 28, 2003

(54) PORTABLE APPARATUS FOR MACHINING PIPE ENDS

(75) Inventor: Stefan Singer, Gottmadingen (DE)

(73) Assignee: Georg Fischer Rohrverbindungstechnik GmbH, Singen (DE)

( * ) Notice: Subject to any disclaimer, the term of this patent is extended or adjusted under 35 U.S.C. 154(b) by 0 days.

(21) Appl. No.: 10/132,247

(22) Filed: Apr. 23, 2002

(65) Prior Publication Data

US 2002/0174751 A1 Nov. 28, 2002

(30) Foreign Application Priority Data

Apr. 24, 2001 (DE) .......................... 101 20 185

(51) Int. Cl.$^7$ ................................. B23B 5/08
(52) U.S. Cl. .......................... 82/113; 82/128
(58) Field of Search ................. 82/113, 128, 130, 82/131; 279/123

(56) References Cited

U.S. PATENT DOCUMENTS

| 4,739,682 A | * | 4/1988 | Birkestrand ............. 408/108 |
| 4,819,385 A | | 4/1989 | Baumann et al. |
| 5,934,688 A | * | 8/1999 | VanderPol et al. ......... 279/58 |
| 5,941,145 A | | 8/1999 | Marshall et al. |

FOREIGN PATENT DOCUMENTS

FR    2 802 134    2/2002

\* cited by examiner

Primary Examiner—Willmon Fridie, Jr.
(74) Attorney, Agent, or Firm—Bachman & LaPointe, P.C.

(57) ABSTRACT

A portable apparatus for machining pipe ends comprising a base plate for putting the apparatus on any desired base, an accommodating housing which is connected to the base plate and is intended for accommodating a drive arrangement and a gearing arrangement for driving a cutting tool and for accommodating a feed arrangement for feeding the cutting tool in the direction of a pipe end to be machined, a clamping device for clamping a pipe to be machined, a coupling arrangement for coupling the apparatus to a drive source, and a feed control device for controlling the feed of the cutting tool, a clamping lever being arranged such that it can be fastened in the clamping device so as to be movable from a first unclamped position into a second clamped position, and the clamping lever having an eccentric contour.

13 Claims, 5 Drawing Sheets

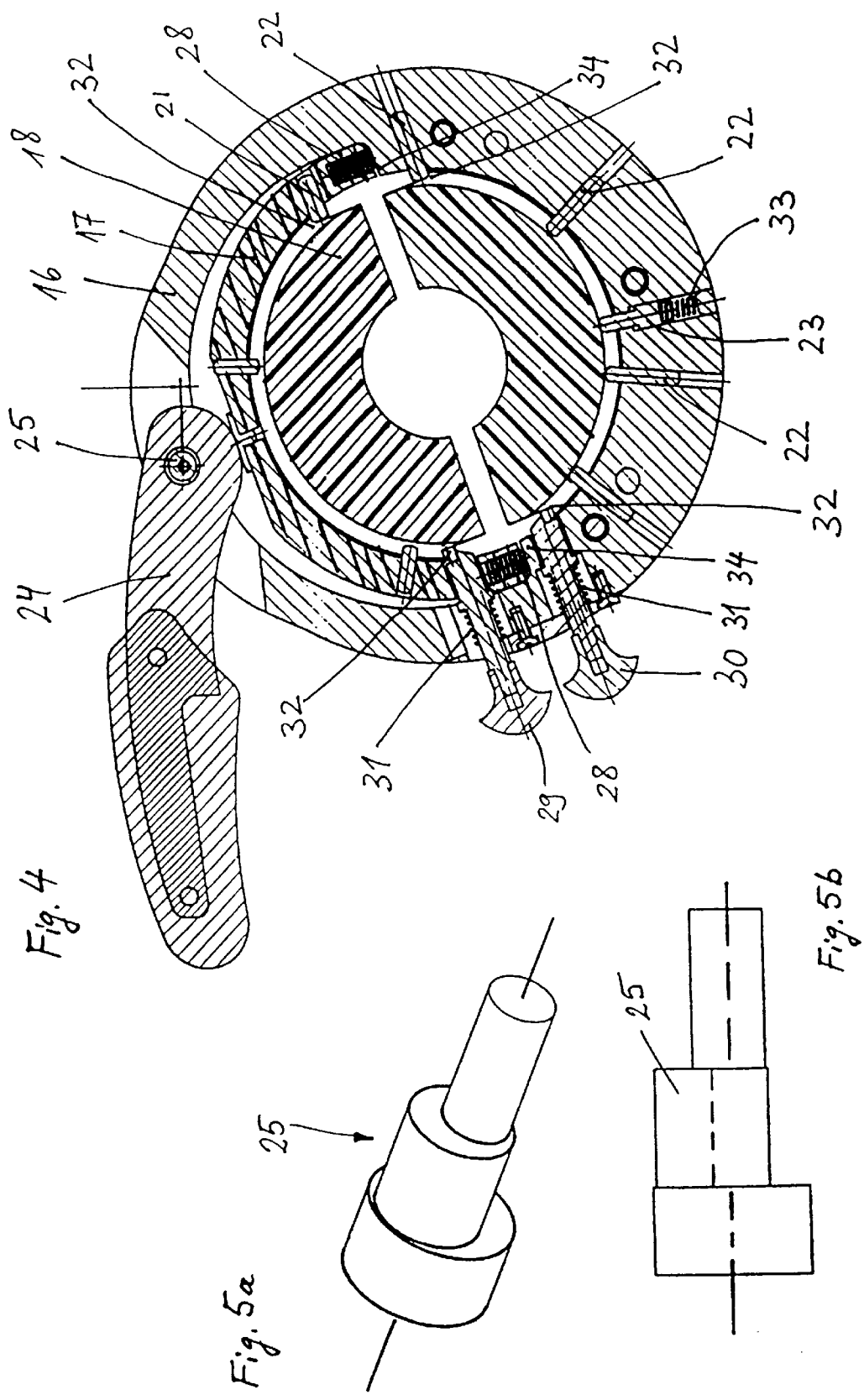

PORTABLE APPARATUS FOR MACHINING PIPE ENDS

BACKGROUND OF THE INVENTION

The invention relates to a portable apparatus for machining pipe ends, comprising a base plate for putting the apparatus on any desired base, an accommodating housing which is connected to the base plate and is intended for accommodating a drive arrangement and a gearing arrangement for driving a cutting tool and for accommodating a feed arrangement for feeding the cutting tool in the direction of a pipe end to be machined, a clamping device for clamping a pipe to be machined, a coupling arrangement for coupling the apparatus to a drive source, and a feed control device for controlling the feed of the cutting tool.

In pipeline construction, the end faces of the pipe ends to be connected must be reworked perpendicular to the pipeline axis as a preparatory step before the assembly of the pipeline sections and fittings by welding processes. In particular thin-walled pipes, that is to say those with wall thicknesses of less than 3 mm, are butt-welded and therefore have to be faced, that is to say made exactly at right angles to the pipeline axis. This preparatory work is necessary in order to remove any possible chips or unevenness, present after the cutting-off or sawing operation at the pipe end, before the welding operation.

An apparatus of the generic type for machining pipes or cylindrical workpieces has been disclosed by U.S. Pat. No. 5,941,145. A drive shaft and a feed control for controlling a tool carrier are arranged in an accommodating housing which has been split in two in the region of the gearing arrangement. The housing is fastened to a base plate. Located in front of the housing is a clamping device. The pipe or the cylindrical workpiece to be machined is clamped in the clamping device by the screwing movement of a spindle as in a machine vice.

SUMMARY OF THE INVENTION

The foregoing object is achieved by a portable apparatus for machining pipe ends, comprising a base plate for putting the apparatus on any desired base, an accommodating housing which is connected to the base plate and is intended for accommodating a drive arrangement and a gearing arrangement for driving a cutting tool and for accommodating a feed arrangement for feeding the cutting tool in the direction of a pipe end to be machined, a clamping device for clamping a pipe to be machined, a coupling arrangement for coupling the apparatus to a drive source, and a feed control device for controlling the feed of the cutting tool, a clamping lever being arranged such that it can be fastened in the clamping device so as to be movable from a first unclamped position into a second clamped position, and the clamping lever having an eccentric contour.

It is advantageous that the pipe to be machined can be clamped both quickly and reliably. This is achieved by the clamping device being essentially composed of a one-piece annular retaining ring which is arranged so as to be firmly connected to the accommodating housing, a curved and movable retaining element being arranged inside the retaining ring, this retaining element being arranged so as to be movable by the clamping lever with respect to the retaining ring in the circular space enclosed by the retaining ring. This is also achieved by two semicircular half shells for clamping the pipe to be machined being arranged in such a way that they can be detachably fastened in the circular space enclosed by the retaining ring. Furthermore, the clamping is simplified by the two half shells being designed to be identical and interchangeable.

It is also advantageous that the working step for clamping the pipe can easily be automated. This is achieved by the of clamping lever being arranged in the retaining ring in such a way that it can be fastened in a movable manner by means of an eccentric pin. This is also achieved by the clamping lever having a clamping surface with an eccentric contour which is designed in such a way that, during the rotating clamping movement of the clamping lever about the eccentric pin, the retaining element can be moved towards the half shells.

Furthermore, it is advantageous that, by means of the clamping lever, the pipe, with a simple movement in one direction, can be both positioned and clamped in the apparatus for machining the pipe end. This is achieved by the clamping lever having a clamping surface with an eccentric contour which is designed in such a way that, during the rotating clamping movement of the clamping lever about the eccentric pin, the half shells are moved towards one another. This is also achieved by the eccentric contour being composed of two sectional contours, arranged so as to adjoin one another and being of different design, in such a way that a first sectional contour, during the rotating clamping movement of the clamping lever about the eccentric pin within a first rotary-angle range of about 90°, moves the half shells towards one another by a first displacement distance S and that a second sectional contour, during the rotating clamping movement of the clamping lever about the eccentric pin within a second rotary-angle range of about 120°, moves the half shells towards one another by a second displacement distance S/2.

Furthermore, it is also advantageous that the feed of the cutting tool can be judged in a simple and accurate manner by the operating personnel. This is achieved by a digital display for displaying the tool feed being arranged such that it can be connected to the feed control device.

BRIEF DESCRIPTION OF THE DRAWINGS

An exemplary embodiment of the invention is described with reference to the figures. In the drawing:

FIG. 4 shows a section through the clamping device in FIG. 2 transversely to the axis of a pipe to be machined, FIG. 5a shows a perspective view of an eccentric pin, FIG. 5b shows a side view of the eccentric pin in FIG. 5a, FIG. 6 shows a section through the apparatus in FIG. 1 along the axis of a pipe to be machined.

DETAILED DESCRIPTION

Figure 1:
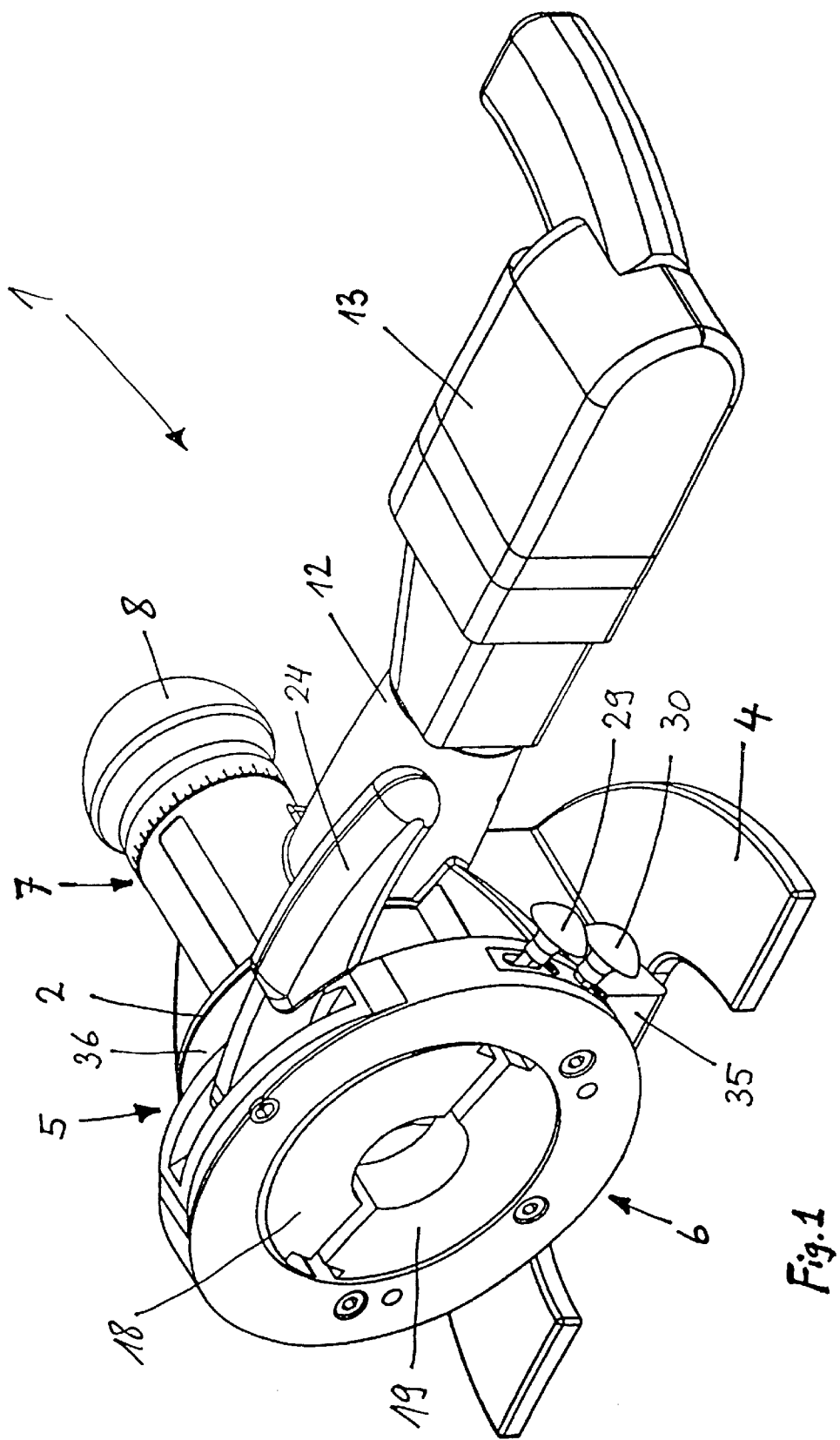
FIG. 1 shows a perspective view of a portable apparatus according to the invention for machining pipe ends.
Figure 2:
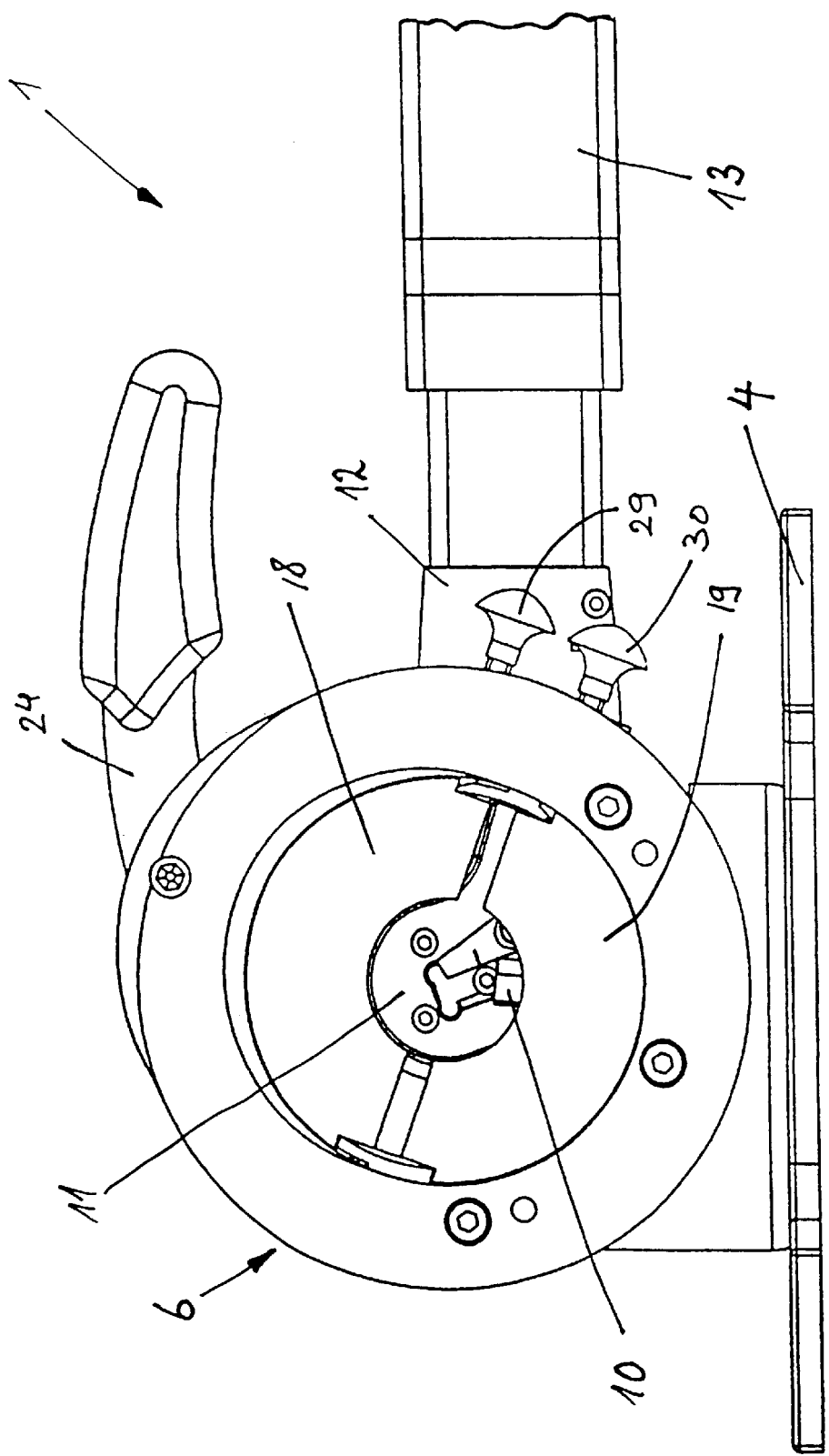
FIG. 2 shows a view of the apparatus in FIG. 1 towards the clamping device.
Figure 3:
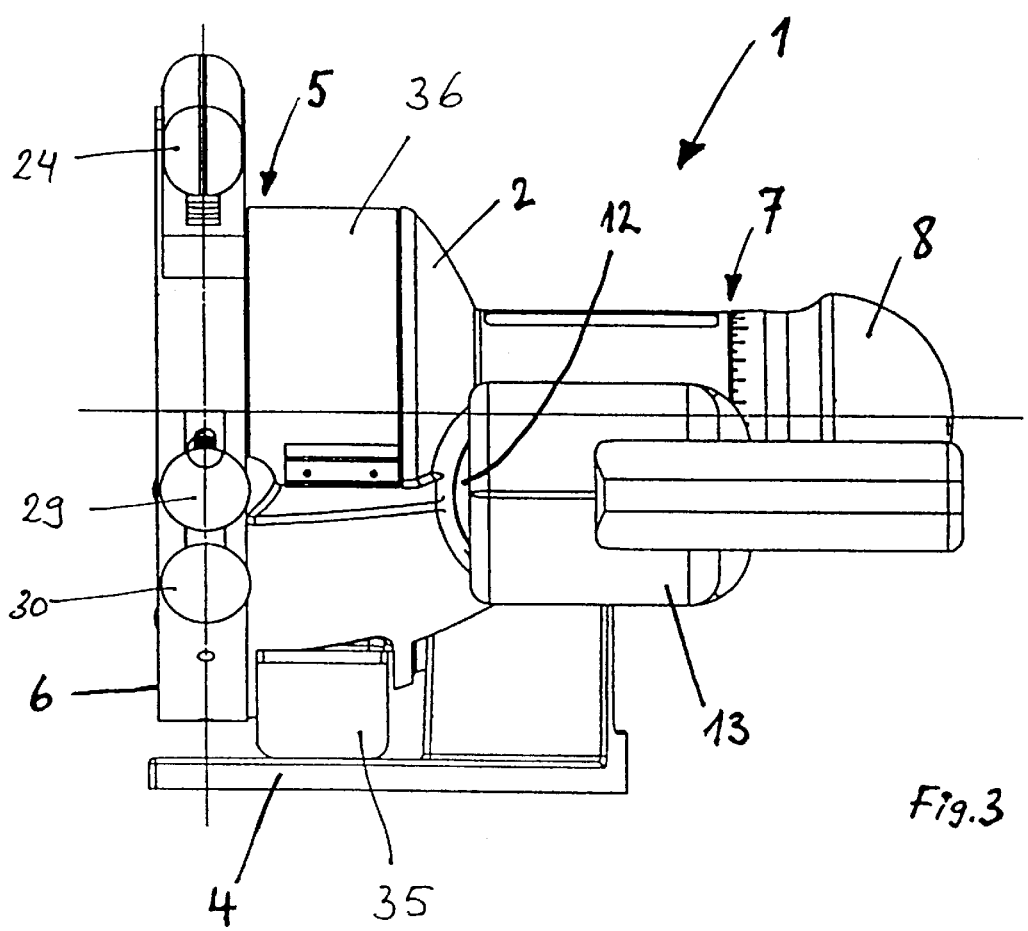
FIG. 3 shows a side view of the apparatus in FIG. 1.

A portable apparatus 1 for machining pipe ends is shown in FIGS. 1, 2 and 3. The apparatus 1 is especially designed for machining thin-walled pipes of corrosion-resistant high-grade-steel alloys, such as, for example, alloys according to DIN standards 1.4304 or 1.4435. These alloys are often used for pipelines in plants which are subject to the highest purity requirements, such as, for example, in the pharmaceutical industry or in the manufacture of elements in microelectronics. In these industries, no cooling or lubricating oil must be used during the machining of the pipes. The chips which are produced when working the pipes are also to be restricted to a minimum. The chips produced must not pass into the environment of the plant and must be capable of being disposed of from the plant in a simple manner. These restrictions mean, inter alia, that the pipes must not be sawn for example. Steel alloys which are highly corrosion-resistant can often only be cut with difficulty, or cannot be cut at all, since the material is too tough.

The portable apparatus 1 essentially comprises an accommodating housing 2 which is fastened to a base plate 4, for example by means of screws. The base plate 4 enables the apparatus 1 to also be set up on a base which is not completely level, for example on a construction site, and yet enables a stable set-up to be achieved. A clamping device 6 can be seen on a front side 5 of the accommodating housing 2 in FIGS. 1, 2 and 3. The accommodating housing 2 is produced from a casting, for example from a steel or aluminium alloy, and extends from the front side 5 up to a rear side 7, adjoining which is a tool-feed control device 8. The control device 8 serves to control the feed of a cutting tool 10 for example, which is clamped in a tool holder 11 and serves to machine the end faces of metal pipes.

A section of the tool holder 11 can be seen in FIG. 2. Examples of the cutting tool 10 and the tool holder 11 have been described in an earlier U.S. Pat. No. 6,082,235 of the same applicant. The clamping device 6, the tool holder 11, the accommodating housing 2 and the feed control device 8 are arranged one behind the other on a line which coincides with the axis of the pipe to be machined. Transversely to this pipe axis, a coupling arrangement 12 and a drive source 13 can be seen on the accommodating housing 2. The drive source 13 is, for example, the drive unit of a commercially available drilling machine or another electrical or pneumatic drive source with the output required for the task of the apparatus and the necessary speed it range. The drive source 13 is detachably connected to the cutting tool 10 by means of the coupling arrangement 12 at a gearing arrangement 14 and a drive arrangement 15 in the accommodating housing 2. The gearing arrangement 14 and the drive arrangement 15 for the drive of the tool holder 11 and of the cutting tool 10 can be seen in the sectioned representation of FIG. 6.

In FIG. 4, the clamping device 6 is sectioned perpendicularly to the pipe axis, that is to say perpendicularly to the main axis of the accommodating housing 2 and is shown as viewed from the front side 5 of the accommodating housing 2. The clamping device 6 essentially comprises a one-piece and annular retaining ring 16 in which a curved retaining element 17 is arranged in a movable manner. Two half shells, a top first half shell 18 and a bottom second half shell 19, are arranged in the circular space which is enclosed by the retaining ring 16 and in which the retaining element 17 can be moved. The retaining ring 16 is firmly connected to the accommodating housing 2 or to the base plate 4 in the bottom region of the clamping device 6. The essentially half-ring-shaped retaining element 17 is arranged in the circular space in such a way as to be movable with respect to the retaining ring 16 and has an inner radius which corresponds to the outer radius of the half shells 18, 19. The half shells 18, 19 are designed to be identical and interchangeable. The half shells 18, 19 have an inner radius which corresponds to the outer radius of the pipe to be machined in each case.

On the outer circumference, the half shells 18, 19 have a radial groove 20 into which locating pins 21, 22, 23 inserted in the retaining ring 16 and in the retaining element 17 fit. This achieves the effect that the half shells 18, 19 are held in a fixed position in the direction of the pipe axis in the ready-to-operate state, but can be moved in a plane transversely to the pipe axis and exchanged before and after the actual machining operation in order to release and adapt the half shells 18, 19 to different pipe diameters. A locating pin 23 of special design can be seen in the bottom region of the retaining ring 16, this locating pin 23 being held under spring stress by means of a spring 33.

If the half shells 18, 19 have to be exchanged, the bottom half shell 19 is lifted upwards by the locating pin 23 and the relaxing spring 33. A robust, fixed unit is formed in the ready-to-operate state by the use of the locating pins 21, 22, 23 in the groove 20. The top half shell 18 forms a robust unit with the retaining element 17, and the bottom half shell 19 forms a robust unit with the retaining ring 16. The combination of groove and locating pins is simpler for the user than a connection by means of screws, which can only be released and fastened by means of special spanners and with additional expenditure of time. The spring-loaded locating pin 23 causes the bottom half shell 19 to be lifted upwards without additional effort and without extra manipulations when the half shells have to be exchanged. A clamping lever 24 which is fastened inside the retaining ring 16 in a rotatable manner can also be seen in FIG. 1 and in particular in FIG. 4. The clamping lever 24 is arranged in the retaining ring 16 by means of an eccentric pin 25. The eccentric pin 25 is shown on its own in FIGS. 5a and 5b.

Figure 7:
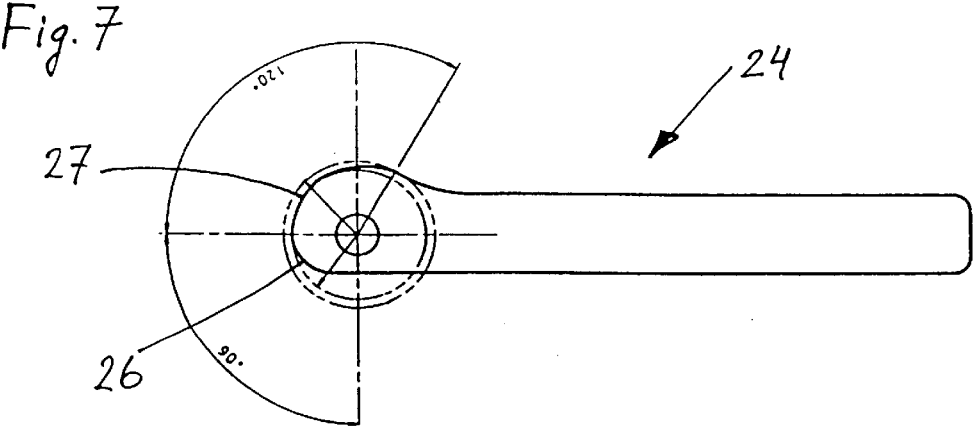
FIG. 7 shows a view of a clamping lever with an eccentric contour.

The clamping lever 24 is shown in detail in the side view in FIG. 7. As can be seen from FIG. 7, the clamping lever 24 has a clamping surface with an eccentric contour 26, 27 in the region with which the clamping lever 24 is fastened to the retaining ring 16 in a rotatable manner by means of the eccentric pin 25. The eccentric contour 26, 27 of the clamping lever 24 achieves the effect that the rotary movement of the clamping lever 24 about the eccentric pin 25 is converted into a rectilinear movement of the retaining element 17 and of the top half shell 18, which together form a unit.

It can also be seen in FIG. 7 how the eccentric contour is composed of two sectional contours—a first sectional contour 26 and a second sectional contour 27. The first sectional contour 26 covers a first rotary-angle range of the clamping lever 24 of about 90°, and the second sectional contour 27 covers a second rotary-angle range of about 120°. Within the first rotary-angle range, the outer radius of the clamping lever 24 changes by a larger value, for example 9 mm; within the second rotary-angle range, the outer radius of the clamping lever 24 changes by a substantially smaller value, for example 3 mm. Together with the larger rotary angle, this results in a much larger slope in the region of the first sectional contour 26 than in the region of the second sectional contour 27. In the region of the second sectional contour 27, the slope is so small, for example less than 5°, that self-locking is achieved. In the region of the first sectional contour 26, the first half shell 18 is thus brought up to the second, bottom half shell 19 in a rapid feed by the rotary movement of the clamping lever, and in the region of the second sectional contour 27 the top half shell 18 is fixed about the pipe in the clamping device 6 by the self-locking.

The pipe is clamped and fixed in the clamping device 6 by the simple continuous lever movement of the clamping lever 24. This lever movement can easily be executed by a robot or can otherwise be actuated in an automated manner. The clamping lever 24 may also be connected to the retaining ring 16 by means of a headless set screw instead of with an eccentric pin 25. For the rapid feed, the retaining element 17 is then brought upwards close to the clamping lever 24 by one or more rotary movements of the clamping lever. An eccentric contour which corresponds with the second sectional contour 27 and produces self-locking again provides for the final fixing.

Two coil springs 28 which are arranged on opposite sides in matching spring receptacles in the retaining element 17 can also be seen in FIG. 4. The coil springs 28 act on projections 34 on the retaining ring 16 and enable the retaining element 17 to be released from the top first half shell 18 and lifted upwards when the clamping lever 24 is moved from a tightened position, which is shown for instance in FIGS. 1, 2 and 4, into the unclamped position. In the process, the locating pins 21 are lifted out of the groove 20, and the top half shell 18 releases the clamped pipe. If necessary, for example if a new pipe having a different pipeline diameter has to be machined, the half shells 18, 19 can be exchanged.

On one side of the half shells 18, 19, two spring-loaded latches 29, 30 are also shown in the retaining ring 16. The latches 29, 30 are moved in a spring-loaded manner by matching springs 31 into a rest position which corresponds approximately to the representation in FIG. 4. The springs 31 press the latches 29, 30 from the outside inwards against the half shells 18, 19. Due to the relaxing of the spring 31, the top first latch 29 moves through the retaining ring 16 and through the retaining element 17 in the direction of a latching step 32 which is formed on the first top half shell 18. The second bottom latch 30 engages in the same manner on an identical step 32 of the second bottom half shell 19 and likewise passes through the retaining ring 16. By the engagement of the latches 29, 30 on the latching steps 32 of the half shells 18, 19, the latter are additionally secured in their position, a factor which contributes to vibration-free mounting of the pipe to be machined. When the latches 29, 30 are pulled out by the user, once the clamping lever 24 has been released, the half shells 18, 19 are released from the clamped pipe and can be moved upwards, for example if the half shells have to be exchanged.

Figure 6:
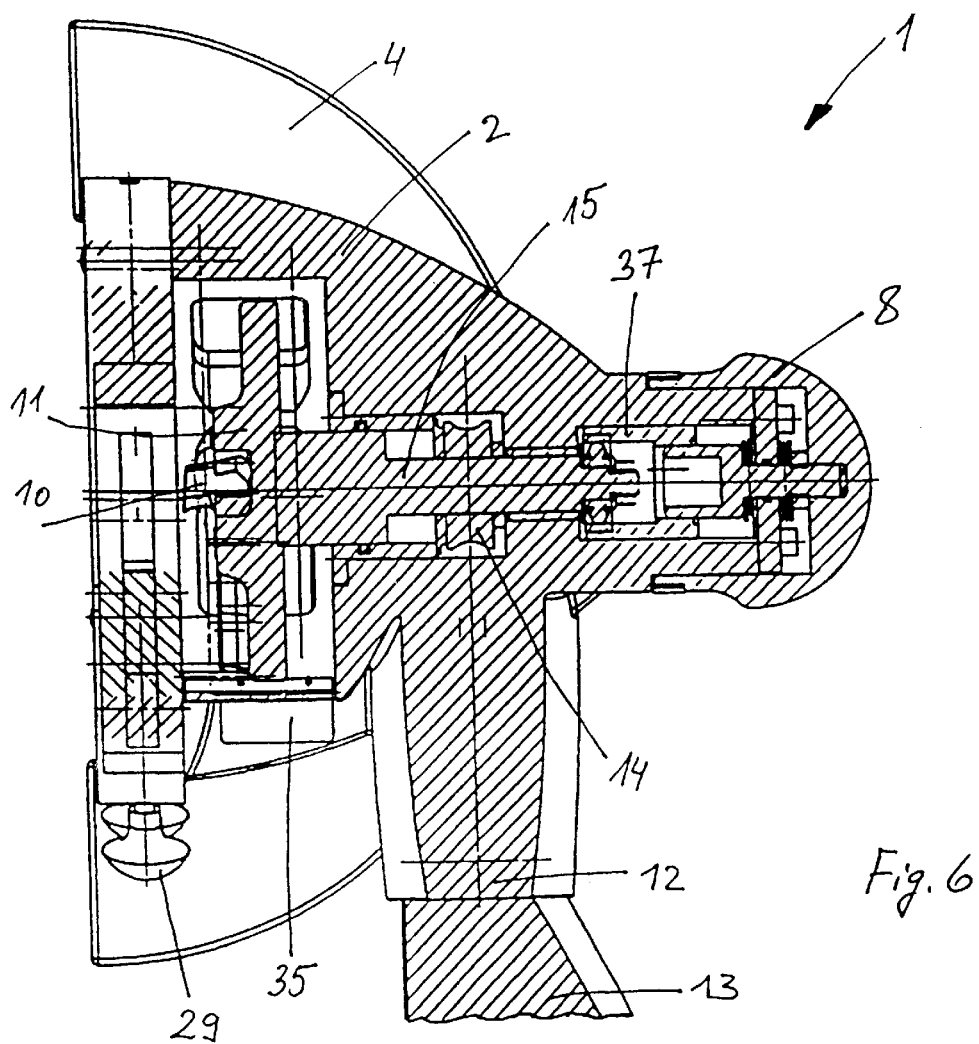

The control device 8 for controlling the feed of the tool holder 11 with the cutting tool 10 fastened therein is shown sectioned in FIG. 6. The drive arrangement 15, here a solid shaft 15, is shown between the tool holder 11 and the tool-feed control device 8. The shaft 15 is connected to the drive source 13 via a gearing arrangement 14, here worm gearing 14. A pan 35 which is arranged under the tool holder 11 can also be seen in FIGS. 2, 3 and 6. Together with a guard cover 36, which can best be seen in FIG. 3, the pan 35 serves to collect the chips which are flung away during the rotating operation of the tool holder 11, so that they do not pass into the surroundings of the pipe to be machined.

Also shown in the accommodating housing 2, which is made in one piece from a casting, for example from a cast-iron or light-metal alloy, is the feed arrangement 37 for feeding the tool holder 11 through a continuous cylindrical bore through the accommodating housing 2. The control device 8 for controlling the feed may also be connected to a digital display. This enables the user to precisely monitor the progress of the feed even in the case of very small feed values. This is especially advantageous in the case of tough steel alloys, which tend to overheat if the feed is too fast.

What is claimed is:

1. Portable apparatus for machining pipe ends, comprising a base plate, a housing which is connected to the base plate, a drive arrangement, a gearing arrangement for driving a cutting tool and a feed arrangement for feeding the cutting tool in the direction of a pipe end to be machined, a clamping device for clamping a pipe to be machined, a coupling arrangement for coupling the apparatus to a drive source, and a feed control device for controlling the feed of the cutting tool, wherein a moveable clamping lever is arranged in the clamping device and is movable from a first unclamped position into a second clamped position, the clamping lever having an eccentric contour, wherein the clamping device is composed of a one-piece annular retaining ring which is arranged so as to be firmly connected to the housing, a curved and movable retaining element is arranged inside the retaining ring, the retaining element is movable by the clamping lever with respect to the retaining ring in the circular space enclosed by the retaining ring.

2. Portable apparatus for machining pipe ends according to claim 1, wherein two semicircular half shells for clamping the pipe to be machined are detachably fastened in the circular space enclosed by the retaining ring.

3. Portable apparatus for machining pipe ends according to claim 2, wherein the clamping lever is arranged in the retaining ring and is fastened in a movable manner by means of an eccentric pin.

4. Portable apparatus for machining pipe ends according to claim 3, wherein the clamping lever has a clamping surface with an eccentric contour which, during the rotating clamping movement of the clamping lever about the eccentric pin, the retaining element can be moved with the first half shell in the direction of the second half shell in the retaining ring.

5. Portable apparatus for machining pipe ends according to claim 4, wherein the eccentric contour of the clamping lever comprises two sectional contours, arranged to adjoin one another and being of different design, such that a first sectional contour, during the rotating clamping movement of the clamping lever about the eccentric pin within a first rotary-angle range of about 90°, moves the half shells towards one another in rapid feed by a first displacement distance and that a second sectional contour, during the rotating clamping movement of the clamping lever about the eccentric pin within a second rotary-angle range of about 120°, moves the half shells towards one another with self-locking by a second displacement distance which is many times smaller.

6. Portable apparatus for machining pipe ends according to claim 5, wherein latches are arranged in the retaining ring in such a way that the two half shells can be fastened in a latchable manner between the retaining ring and the retaining element.

7. Portable apparatus for machining pipe ends according to claim 6, wherein the two half shells are designed to be identical and interchangeable.

8. Portable apparatus for machining pipe ends according to claim 7, wherein two springs are arranged inside the retaining element on opposite sides of the half shells, and the springs act against the clamping force on matching projections of the retaining ring.

9. Portable apparatus for machining pipe ends according to claim 8, wherein the housing is designed in one piece.

10. Portable apparatus for machining pipe ends according to claim 1, wherein the housing is arranged between a front side, which is arranged adjacent to the cutting tool, and a rear side, which is arranged adjacent to the feed control device, and has a continuous cylindrical bore for accommodating the drive arrangement and the feed arrangement, the axis of the continuous cylindrical bore being arranged in alignment with the axis of the pipe to be machined, and has a further cylindrical blind hole arranged transversely to the housing axis and intended for accommodating the gearing arrangement and for accommodating the drive source.

11. Portable apparatus for machining pipe ends according to claim 10, wherein a digital display for displaying the tool feed is arranged such that it can be connected to the feed control device.

12. Portable apparatus for machining pipe ends according to claim 1, wherein the pipes to be machined have wall thicknesses of less than 3 mm and are made of corrosion-resistant steel alloys.

13. Portable apparatus for machining pipe ends according to claim 1, wherein the pipes to be machined have wall thicknesses of less than $1/12$ of the pipe inside diameter and are made of corrosion-resistant steel alloys.

* * * * *